United States Patent
Liu et al.

(10) Patent No.: US 9,704,287 B2
(45) Date of Patent: Jul. 11, 2017

(54) METHOD AND APPARATUS FOR ACHIEVING TRANSFORMATION OF A VIRTUAL VIEW INTO A THREE-DIMENSIONAL VIEW

(71) Applicant: Shenzhen Cloud Cube Information Tech Co., Ltd., Shenzhen, Guangdong Province (CN)

(72) Inventors: Meihong Liu, Shenzhen (CN); Wei Gao, Shenzhen (CN); Wanliang Xu, Shenzhen (CN)

(73) Assignee: Shenzhen Cloud Cube Information Tech Co., Ltd., Shenzhen, Guangdong (CN)

( * ) Notice: Subject to any disclaimer, the term of this patent is extended or adjusted under 35 U.S.C. 154(b) by 67 days.

(21) Appl. No.: 14/417,557

(22) PCT Filed: Jul. 23, 2014

(86) PCT No.: PCT/CN2014/082831
§ 371 (c)(1),
(2) Date: Jan. 26, 2015

(87) PCT Pub. No.: WO2015/067071
PCT Pub. Date: May 14, 2015

(65) Prior Publication Data
US 2015/0339844 A1    Nov. 26, 2015

(30) Foreign Application Priority Data

Nov. 5, 2013   (CN) .......................... 2013 1 0542642

(51) Int. Cl.
*G06T 15/00*     (2011.01)
*G06T 15/20*     (2011.01)
(Continued)

(52) U.S. Cl.
CPC ............... *G06T 15/20* (2013.01); *G03H 1/08* (2013.01); *G06T 3/60* (2013.01); *G06T 19/006* (2013.01);
(Continued)

(58) Field of Classification Search
None
See application file for complete search history.

(56) References Cited

U.S. PATENT DOCUMENTS 4,951,040 A * 8/1990 McNeil ................... G06T 3/005
345/427
5,850,225 A * 12/1998 Cosman .................. G06T 3/005
345/427
(Continued)

FOREIGN PATENT DOCUMENTS

CN    101853518 A    10/2010
CN    101866497 A    10/2010
(Continued)

*Primary Examiner* — Anh-Tuan V Nguyen
(74) *Attorney, Agent, or Firm* — Klein, O'Neill & Singh, LLP

(57) ABSTRACT

A method and an apparatus for achieving transformation of a virtual view into a 3D view are provided. The method comprises: S1. capturing position coordinates of a human eye by a human-eye tracking module; S2. determining a rotation angle of a virtual scene and rotating the virtual scene according to the rotation angle to obtain a virtual holographic 3D view matrix by a first image processing module; S3. determining a shearing angle for each of viewpoints to generate a shearing matrix for the viewpoint in one-to-one correspondence, and post-multiplying the shearing matrix with a corresponding viewpoint model matrix to generate a left view and a right view by a second image processing module; and S4. projecting the left view and the right view of each of the viewpoints by the projection displaying module.

6 Claims, 4 Drawing Sheets

(51) Int. Cl.
*G06T 3/60* (2006.01)
*G06T 19/00* (2011.01)
*H04N 13/04* (2006.01)
*G03H 1/08* (2006.01)
*H04N 13/02* (2006.01)

(52) U.S. Cl.
CPC ..... *H04N 13/0278* (2013.01); *H04N 13/0459* (2013.01); *H04N 13/0484* (2013.01)

(56) References Cited

U.S. PATENT DOCUMENTS

| | | | | |
|---|---|---|---|---|
| 6,640,018 | B1* | 10/2003 | Thesen | G06T 3/60 345/649 |
| 7,043,073 | B1* | 5/2006 | Holzbach | G03H 1/268 345/418 |
| 7,113,632 | B2* | 9/2006 | Lee | G06K 9/03 348/E13.014 |
| 7,574,045 | B2 | 8/2009 | Simon et al. | |
| 2001/0014172 | A1* | 8/2001 | Baba | G03H 1/0486 382/154 |
| 2002/0084974 | A1* | 7/2002 | Ohshima | A63F 13/00 345/156 |
| 2003/0055328 | A1* | 3/2003 | Paladini | G06T 11/001 600/407 |
| 2003/0080976 | A1* | 5/2003 | Satoh | G06F 3/014 345/629 |
| 2004/0125103 | A1* | 7/2004 | Kaufman | G06T 15/06 345/419 |
| 2004/0258306 | A1* | 12/2004 | Hashimoto | G06K 9/3216 382/181 |
| 2005/0111700 | A1* | 5/2005 | O'Boyle | G06K 9/00201 382/104 |
| 2006/0050087 | A1* | 3/2006 | Tanimura | G06F 3/011 345/629 |
| 2006/0067573 | A1* | 3/2006 | Parr | G06K 9/00275 382/154 |
| 2006/0212833 | A1* | 9/2006 | Gallagher | G06T 11/206 715/848 |
| 2007/0115370 | A1* | 5/2007 | Sakamoto | H04N 1/60 348/222.1 |
| 2007/0127787 | A1* | 6/2007 | Castleman | G06K 9/00248 382/118 |
| 2007/0196025 | A1* | 8/2007 | Tran | G06F 17/147 382/250 |
| 2008/0018732 | A1* | 1/2008 | Moller | H04N 13/021 348/51 |
| 2010/0110069 | A1* | 5/2010 | Yuan | G06T 15/20 345/419 |
| 2011/0109629 | A1* | 5/2011 | Ericson | H04N 13/0022 345/423 |
| 2012/0075424 | A1* | 3/2012 | Kawamoto | G06T 19/006 348/46 |
| 2012/0105599 | A1* | 5/2012 | Lin | G06T 5/006 348/50 |
| 2012/0133641 | A1* | 5/2012 | Umezu | G03B 35/16 345/419 |
| 2012/0147139 | A1* | 6/2012 | Li | G03B 35/08 348/43 |
| 2013/0071012 | A1* | 3/2013 | Leichsenring | G06K 9/80 382/154 |
| 2013/0155055 | A1* | 6/2013 | Doi | G06T 15/00 345/419 |
| 2013/0187907 | A1* | 7/2013 | Someya | H04N 13/0022 345/419 |
| 2013/0235169 | A1* | 9/2013 | Kato | G02B 27/01 348/53 |
| 2013/0293691 | A1* | 11/2013 | Saito | H04N 13/0404 348/59 |
| 2014/0002443 | A1* | 1/2014 | Cunningham | G06T 19/006 345/419 |
| 2014/0043322 | A1* | 2/2014 | Fulks | G06T 19/006 345/419 |
| 2014/0125774 | A1* | 5/2014 | Lee | G06T 3/4038 348/47 |
| 2014/0145933 | A1* | 5/2014 | Chae | B60K 37/06 345/156 |
| 2014/0225887 | A1* | 8/2014 | Aguirre-Valencia | H04N 13/0022 345/419 |
| 2014/0232637 | A1* | 8/2014 | Park | G02B 27/017 345/156 |
| 2014/0300839 | A1* | 10/2014 | Choe | G02F 1/1313 349/15 |
| 2015/0049201 | A1* | 2/2015 | Liu | H04N 17/00 348/189 |
| 2015/0221074 | A1* | 8/2015 | Simhoni | G06T 19/006 382/154 |

FOREIGN PATENT DOCUMENTS

| | | |
|---|---|---|
| CN | 102509334 A | 6/2012 |
| CN | 103996215 A | 8/2014 |

\* cited by examiner

METHOD AND APPARATUS FOR ACHIEVING TRANSFORMATION OF A VIRTUAL VIEW INTO A THREE-DIMENSIONAL VIEW

FIELD OF THE INVENTION

The present disclosure relates to the technical field of three-dimensional (3D) displaying technologies, and more particularly, to a method and an apparatus for achieving transformation of a virtual view into a 3D view.

CROSS REFERENCE TO RELATED APPLICATIONS

The present application is a 35 U.S.C. §371 National Phase conversion of International (PCT) Patent Application No. PCT/CN2014/082831, filed on Jul. 23, 2014, which claims foreign priority of Chinese Patent Application No. 201310542642.X, filed on Nov. 5, 2013, the disclosure of which is incorporated by reference herein. The PCT International Patent Application was filed and published in Chinese.

BACKGROUND OF THE INVENTION

The conventional technologies for transformation of 2D views into 3D views transform a 2D video into a 3D video through a view transformation method. However, because the technologies are not fully sophisticated, the time-consuming transformation leads to a very high cost, and the 3D effect obtained through the transformation is not ideal, development of the 3D industry has been affected.

To solve the aforesaid technical problem, the present disclosure provides a method and an apparatus for achieving transformation of a virtual view into a 3D view, which allows the user to adjust the 3D effect so as to obtain better holographic 3D visual experiences.

SUMMARY OF THE INVENTION

To at least partly solve the aforesaid problems, a method and an apparatus for achieving transformation of a virtual view into a 3D view are provided in the present disclosure. According to the present disclosure, a rotation angle of a virtual scene is determined by tracking dynamic coordinates of a human eye so that the virtual scene is rotated to obtain a virtual holographic 3D view matrix, then a shearing matrix is post-multiplied with a corresponding viewpoint model matrix and an image of each viewpoint is obtained through projection; and furthermore, the position of the viewer in the scene and the shearing angle are adjusted according to the 3D effect experienced by the user to finally provide a desirable 3D effect.

A first technical solution provided by the present disclosure is to provide a method for achieving transformation of a virtual view into a 3D view, which comprises the following steps of:

S1. capturing position coordinates of a human eye by a human-eye tracking module;

S2. determining a rotation angle of a virtual scene according to the position coordinates of the human eye and coordinates of a center of a screen of a projection displaying module and rotating the virtual view according to the rotation angle to obtain a virtual holographic 3D view matrix by a first image processing module;

S3. determining a shearing angle for each of viewpoints according to coordinates of a center of the virtual scene, position coordinates of a viewer in the scene and coordinates of each of the viewpoints to generate a shearing matrix for each of the viewpoints in one-to-one correspondence, and post-multiplying the shearing matrix with a corresponding viewpoint model matrix to generate a left view and a right view by a second image processing module; and S4. projecting the left view and the right view of each of the viewpoints by the projection displaying module.

The method further comprises the following step:

S5. adjusting the shearing angle of the second image processing module and the position coordinates of the viewer in the scene by the user according to a 3D effect experienced by the user so as to improve the 3D effect of 3D image projection.

If a virtual scene view matrix prior to the rotation is represented by A and a virtual holographic 3D view matrix is represented by A',
then A'=M1*M2*A, $$M1 = \begin{bmatrix} \cos a, 0, -\sin a, 0 \\ 0, 1, 0, 0 \\ \sin a, 0, \cos a, 0 \\ 0, 0, 0, 1 \end{bmatrix}, M2 = \begin{bmatrix} 1, 0, 0, 0 \\ 0, \cos b, \sin b, 0 \\ 1, -\sin b, \cos b, 0 \\ 0, 0, 0, 1 \end{bmatrix},$$

and the 3D view A is post-multiplied with M1 and M2 to obtain the rotated view A', wherein in a 3D space rectangular coordinate system O-XYZ prior to the rotation, the center of the screen is located at an origin of the coordinate system O-XYZ, a projection of a connecting line from the human eye to the center of the screen on the XOZ plane includes an angle $\alpha$ with the positive Z-axis direction, a projection of the connecting line from the human eye to the center of the screen on the YOZ plane includes an angle $\beta$ with the positive Z-axis direction, the X-axis direction points from a midpoint of a left edge of the screen towards a midpoint of a right edge of the screen, and the Y-axis direction points from a midpoint of a top edge of the screen towards a midpoint of a bottom edge of the screen, and an angle by which the scene is rotated about the Y-axis is determined to be $$a = \arctan \frac{L \cdot \tan\alpha}{L + Z}$$

and an angle by which the scene is rotated about the X-axis is determined to be $$b = \arctan \frac{L \cdot \tan\beta}{L + Z}$$

according to the angles $\alpha$ and $\beta$, a distance L from the human eye to the screen and a distance Z from the center of the scene to the screen.

The method further comprises the following step:

S5. adjusting the shearing angle of the second image processing module and the position coordinates of the viewer in the scene by the user according to a 3D effect experienced by the user so as to improve the 3D effect of projecting a 3D image.

If a new coordinate system after the rotation is represented by O'-X'Y'Z', the origin O' coincides with the center position of the viewpoint in the original coordinate system, the positive Z'-axis direction points from the coordinates of the viewer in the original coordinate system towards the coordinates of the center of the viewpoint, the shearing transformation refers to a transformation in which y' and z' coordinates of the viewpoint remain unchanged and an x' coordinate is linearly transformed by taking the z' axis as a dependent axis, the shearing angle θ refers to an angle included between the position of the viewpoint and the positive Z'-axis direction, and coordinates of any of the viewpoints are represented by (x", y", z") after the shearing, then the shearing expression is as follows for all viewpoints located at the negative X'-axis direction:

$$\begin{cases} x'' = x' + (z' - z_G)\tan\theta \\ y'' = y' \\ z'' = z' \end{cases},$$

the corresponding shearing matrice are all as follows:

$$\begin{bmatrix} 1, 0, \tan\theta, -z_G\tan\theta \\ 0, 1, 0, 0 \\ 0, 0, 1, 0 \\ 0, 0, 0, 1 \end{bmatrix},$$

the shearing expression is as follows for all viewpoints located at the positive X'-axis direction:

$$\begin{cases} x'' = x' - (z' - z_G)\tan\theta \\ y'' = y' \\ z'' = z' \end{cases}$$

the corresponding shearing matrice are all as follows:

$$\begin{bmatrix} 1, 0, -\tan\theta, z_G\tan\theta \\ 0, 1, 0, 0 \\ 0, 0, 1, 0 \\ 0, 0, 0, 1 \end{bmatrix}$$

The method further comprises the following step:

S5. adjusting the shearing angle of the second image processing module and the position coordinates of the viewer in the scene by the user according to a 3D effect experienced by the user so as to improve the 3D effect of projecting a 3D image.

A second technical solution provided by the present disclosure is to provide an apparatus for achieving transformation of a virtual view into a 3D view, which comprises:

a human-eye tracking module, being configured to capture position coordinates of a human eye;

a first image processing module electrically connected with the human-eye tracking module, being configured to determine a rotation angle of a virtual scene according to the position coordinates of the human eye and coordinates of a center of a screen of a projection displaying module and rotate the virtual view according to the rotation angle to obtain a virtual holographic 3D view matrix;

a second image processing module electrically connected with the first image processing module, being configured to determine a shearing angle for each of viewpoints according to coordinates of a center of the virtual scene, position coordinates of a viewer in the scene and coordinates of each of the viewpoints to generate a shearing matrix for each of the viewpoints in one-to-one correspondence, and post-multiply the shearing matrix with a corresponding viewpoint model matrix to generate a left view and a right view; and the projection displaying module electrically connected with the second image processing module, being configured to project the left view and the right view of each of the viewpoints.

The second image processing module is further configured to change the shearing angle and the position coordinates of the viewer in the scene according to a user's input so as to improve the 3D effect of a 3D image obtained by the projection.

If a virtual scene view matrix prior to the rotation is represented by A and a virtual holographic 3D view matrix is represented by A', then A'=M1*M2*A, $$M1 = \begin{bmatrix} \cos a, 0, -\sin a, 0 \\ 0, 1, 0, 0 \\ \sin a, 0, \cos a, 0 \\ 0, 0, 0, 1 \end{bmatrix}, M2 = \begin{bmatrix} 1, 0, 0, 0 \\ 0, \cos b, \sin b, 0 \\ 1, -\sin b, \cos b, 0 \\ 0, 0, 0, 1 \end{bmatrix},$$

and the 3D view A is post-multiplied with M1 and M2 to obtain the rotated view A', wherein in a 3D space rectangular coordinate system O-XYZ prior to the rotation, the center of the screen is located at an origin of the coordinate system O-XYZ, a projection of a connecting line from the human eye to the center of the screen on the XOZ plane includes an angle α with the positive Z-axis direction, a projection of the connecting line from the human eye to the center of the screen on the YOZ plane includes an angle β with the positive Z-axis direction, the X-axis direction points from a midpoint of a left edge of the screen towards a midpoint of a right edge of the screen, and the Y-axis direction points from a midpoint of a top edge of the screen towards a midpoint of a bottom edge of the screen, and an angle by which the scene is rotated about the Y-axis is determined to be $$a = \arctan\frac{L \cdot \tan\alpha}{L + Z}$$

and an angle by which the scene is rotated about the X-axis is determined to be $$b = \arctan\frac{L \cdot \tan\beta}{L + Z}$$

according to the angles α and β, a distance L from the human eye to the screen and a distance Z from the center of the scene to the screen.

The second image processing module is further configured to change the shearing angle and the position coordinates of the viewer in the scene according to a user's input so as to improve the 3D effect of a 3D image obtained by the projection.

If a new coordinate system after the rotation is represented by O'-X'Y'Z', the origin O' coincides with the center position of the viewpoint in the original coordinate system, the positive Z'-axis direction points from the coordinates of the viewer in the original coordinate system towards the coordinates of the center of the viewpoint, the shearing transformation refers to a transformation in which y' and z' coordinates of the viewpoint remain unchanged and an x' coordinate is linearly transformed by taking the z' axis as a dependent axis, the shearing angle θ refers to an angle included between the position of the viewpoint and the positive Z'-axis direction, and coordinates of any of the viewpoints are represented by (x", y", z") after the shearing, then the shearing expression is as follows for all viewpoints located at the negative X'-axis direction:

$$\begin{cases} x'' = x' + (z' - z_G)\tan\theta \\ y'' = y' \\ z'' = z' \end{cases},$$

the corresponding shearing matrice are all as follows:

$$\begin{bmatrix} 1, 0, \tan\theta, -z_G\tan\theta \\ 0, 1, 0, 0 \\ 0, 0, 1, 0 \\ 0, 0, 0, 1 \end{bmatrix},$$

the shearing expression is as follows for all viewpoints located at the positive X'-axis direction:

$$\begin{cases} x'' = x' - (z' - z_G)\tan\theta \\ y'' = y' \\ z'' = z' \end{cases},$$

the corresponding shearing matrice are all as follows:

$$\begin{bmatrix} 1, 0, -\tan\theta, z_G\tan\theta \\ 0, 1, 0, 0 \\ 0, 0, 1, 0 \\ 0, 0, 0, 1 \end{bmatrix}.$$

The second image processing module is further configured to change the shearing angle and the position coordinates of the viewer in the scene according to a user's input so as to improve the 3D effect of a 3D image obtained by the projection.

A third technical solution provided by the present disclosure is to provide an apparatus for achieving transformation of a virtual view into a 3D view, which comprises a non-transitory program storage medium and a processor, the non-transitory program storage medium stores a program executed by the processor to perform a method which comprises:

capturing position coordinates of a human eye by a human-eye tracking module;

determining a rotation angle of a virtual scene according to the position coordinates of the human eye and coordinates of a center of a screen of a projection displaying module, and rotating the virtual scene according to the rotation angle to obtain a virtual holographic 3D view matrix by a first image processing module;

determining a shearing angle for each of viewpoints according to coordinates of a center of the virtual scene, position coordinates of a viewer in the scene and coordinates of each of the viewpoints to generate a shearing matrix for each of the viewpoints in one-to-one correspondence, and post-multiplying the shearing matrix with a corresponding viewpoint model matrix to generate a left view and a right view by a second image processing module; and projecting the left view and the right view of each of the viewpoints by the projection displaying module.

The method performed by the processor further comprises: adjusting the shearing angle of the second image processing module and the position coordinates of the viewer in the scene by the user according to a 3D effect experienced by the user so as to improve the 3D effect of 3D image projection.

If a virtual scene view matrix prior to the rotation is represented by A and the virtual holographic 3D view matrix is represented by A', then A'=M1*M2*A, $$M1 = \begin{bmatrix} \cos a, 0, -\sin a, 0 \\ 0, 1, 0, 0 \\ \sin a, 0, \cos a, 0 \\ 0, 0, 0, 1 \end{bmatrix}, M2 = \begin{bmatrix} 1, 0, 0, 0 \\ 0, \cos b, \sin b, 0 \\ 1, -\sin b, \cos b, 0 \\ 0, 0, 0, 1 \end{bmatrix},$$

and the 3D view A is post-multiplied with M1 and M2 to obtain the rotated view A', wherein in a 3D space rectangular coordinate system O-XYZ prior to the rotation, the center of the screen is located at an origin of the coordinate system O-XYZ, a projection of a connecting line from the human eye to the center of the screen on the XOZ plane includes an angle α with the positive Z-axis direction, a projection of the connecting line from the human eye to the center of the screen on the YOZ plane includes an angle β with the positive Z-axis direction, the X-axis direction points from a midpoint of a left edge of the screen towards a midpoint of a right edge of the screen, and the Y-axis direction points from a midpoint of a top edge of the screen towards a midpoint of a bottom edge of the screen, and an angle by which the scene is rotated about the Y-axis is determined to be $$a = \arctan\frac{L \cdot \tan\alpha}{L+Z}$$

and an angle by which the scene is rotated about the X-axis is determined to be $$b = \arctan\frac{L \cdot \tan\beta}{L+Z}$$

according to the angles α and β, a distance L from the human eye to the screen and a distance Z from the center of the scene to the screen.

The method performed by the processor further comprises: adjusting the shearing angle of the second image processing module and the position coordinates of the viewer in the scene by the user according to a 3D effect experienced by the user so as to improve the 3D effect of projecting a 3D image.

If a new coordinate system after the rotation is represented by O'-X'Y'Z', the origin O' coincides with the center position of the viewpoint in the original coordinate system, the positive Z'-axis direction points from the coordinates of the viewer in the original coordinate system towards the coordinates of the center of the viewpoint, the shearing transformation refers to a transformation in which y' and z' coordinates of the viewpoint remain unchanged and an x' coordinate is linearly transformed by taking the z' axis as a dependent axis, the shearing angle θ refers to an angle included between the position of the viewpoint and the positive Z'-axis direction, and coordinates of any of the viewpoints are represented by (x", y", z") after the shearing, then the shearing expression is as follows for all viewpoints located at the negative X'-axis direction:

$$\begin{cases} x'' = x' + (z' - z_G)\tan\theta \\ y'' = y' \\ z'' = z' \end{cases}$$

the corresponding shearing matrix are all as follows:

$$\begin{bmatrix} 1, 0, \tan\theta, -z_G\tan\theta \\ 0, 1, 0, 0 \\ 0, 0, 1, 0 \\ 0, 0, 0, 1 \end{bmatrix},$$

the shearing expression is as follows for all viewpoints located at the positive X'-axis direction:

$$\begin{cases} x'' = x' - (z' - z_G)\tan\theta \\ y'' = y' \\ z'' = z' \end{cases}$$

the corresponding shearing matrix are all as follows:

$$\begin{bmatrix} 1, 0, -\tan\theta, z_G\tan\theta \\ 0, 1, 0, 0 \\ 0, 0, 1, 0 \\ 0, 0, 0, 1 \end{bmatrix}.$$

The method performed by the processor further comprises: adjusting the shearing angle of the second image processing module and the position coordinates of the viewer in the scene by the user according to a 3D effect experienced by the user so as to improve the 3D effect of projecting a 3D image.

The present disclosure provides the following benefits: as compared with the prior art, a method and an apparatus for achieving transformation of a virtual view into a 3D view provided by the present disclosure determine a rotation angle of a virtual scene by tracking dynamic coordinates of a human eye so that the virtual scene is rotated to obtain a virtual holographic 3D view matrix, then post-multiply a shearing matrix with a corresponding viewpoint model matrix and obtain an image of each viewpoint through projection, and adjust the position of the viewer in the scene and the shearing angle according to a 3D effect experienced by a user to finally provide a desirable 3D effect.

DETAILED DESCRIPTION OF THE INVENTION

Hereinbelow, the present disclosure will be detailed with reference to the attached drawings and the embodiments thereof.

Figure 1:
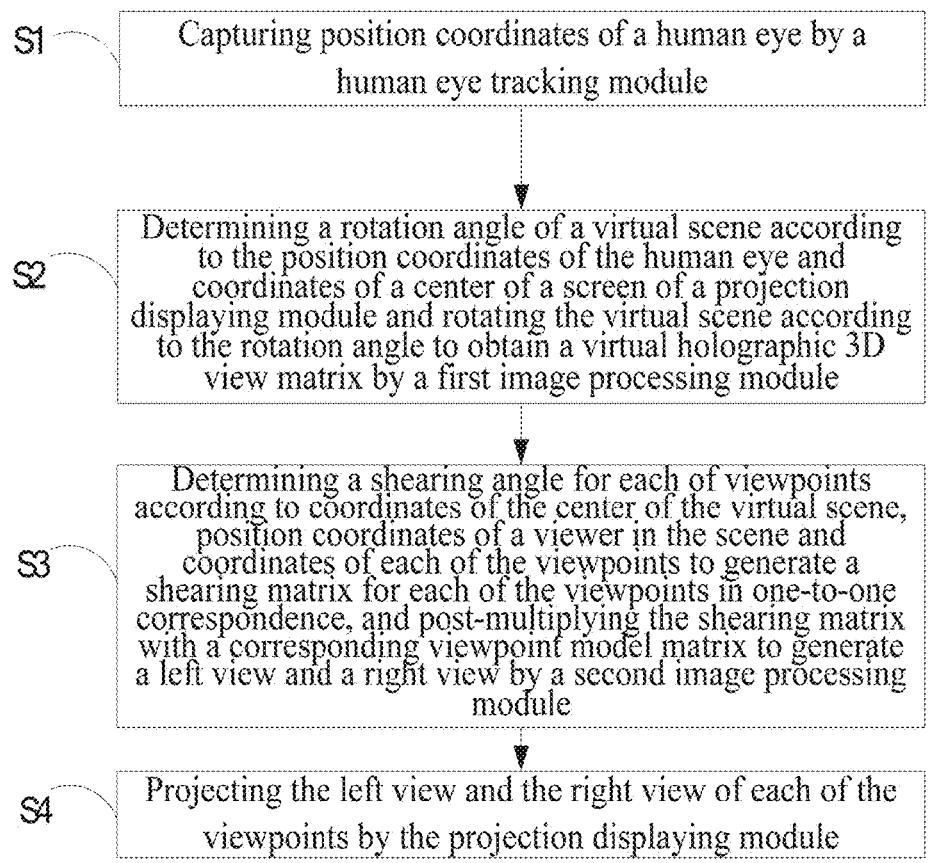
FIG. 1 is a schematic flowchart diagram of an embodiment of a method for achieving transformation of a virtual view into a 3D view according to the present disclosure.
Figure 2:
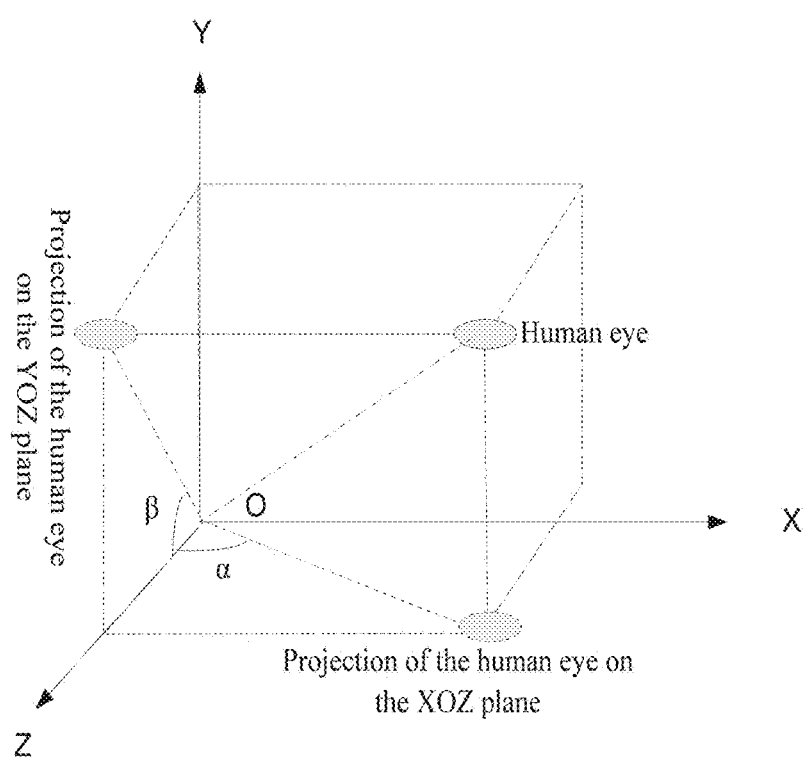
FIG. 2 is a schematic view illustrating angles included between position coordinates of a human eye and a screen in the embodiment shown in FIG. 1.

A first technical solution of the present disclosure is to provide a method for achieving transformation of a virtual view into a 3D view. Referring to FIG. 1, there is shown a schematic flowchart diagram of an embodiment of the method for achieving transformation of a virtual view into a 3D view. As shown in FIG. 1, the method for achieving transformation of a virtual view into a 3D view of this embodiment comprises the following steps of:

S1. capturing position coordinates of a human eye by a human-eye tracking module to track the position of the human eye in real time. Referring to FIG. 2, there is shown a schematic view illustrating angles included between the position coordinates of the human eye and a screen in the embodiment shown in FIG. 1. As shown in FIG. 2, in a 3D space rectangular coordinate system O-XYZ prior to the rotation of a virtual scene, the center of the screen is located at an origin O of the coordinate system O-XYZ, a projection of a connecting line from the human eye to the center O of the screen on the XOZ plane includes an angle α with the positive Z-axis direction, a projection of the connecting line from the human eye to the center O of the screen on the YOZ plane includes an angle β with the positive Z-axis direction, the X-axis direction points from a midpoint of a left edge of the screen towards a midpoint of a right edge of the screen, and the Y-axis direction points from a midpoint of a top edge of the screen towards a midpoint of a bottom edge of the screen. In this embodiment, by use of the human-eye tracking module, projection images seen by the human eye can vary with different positions of the human eye so that the user can experience a desirable 3D effect even during a moving process.

S2. determining a rotation angle of a virtual scene according to the position coordinates of the human eye and coordinates of a center of a screen of a projection displaying module and rotating the virtual scene according to the rotation angle to obtain a virtual holographic 3D view matrix by a first image processing module.

Figure 3:
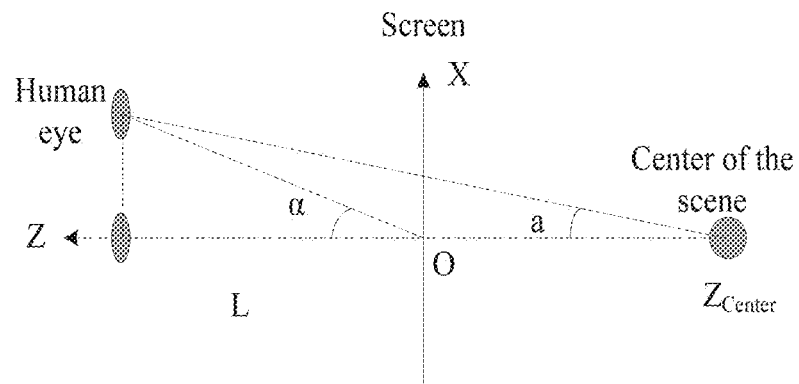
FIG. 3 is a schematic view illustrating position relationships between an angle by which a virtual scene is rotated about the Y-axis and the position of the human eye, a center of the scene and the screen in the embodiment shown in FIG. 1.

A preferred solution of the step of rotating the image in the method for achieving transformation of a virtual view into a 3D view according to the present disclosure is shown in FIG. 3. FIG. 3 is a schematic view illustrating position relationships between an angel by which the virtual scene is rotated about the Y-axis and the position of the human eye, the center of the scene and the screen in the embodiment shown in FIG. 1. As shown in FIG. 3, a distance from a projection of the human eye on the XOZ plane to the screen is L, and a distance from a center of the virtual scene to the screen is $Z_{Center}$.

An angle a by which the scene is rotated about the Y-axis is represented by $$a = \arctan\frac{L \cdot \tan\alpha}{L+Z}$$

and, similarly, an angle by which the scene is rotated about the X-axis is represented by $$b = \arctan\frac{L \cdot \tan\beta}{L+Z}.$$

The virtual holographic 3D view matrix is obtained by rotating the original virtual scene about the Y-axis by the angle a and then about the X-axis by the angle b. If a virtual scene view matrix prior to the rotation is represented by A and the virtual holographic 3D view matrix is represented by A', then A'=M1*M2*A.

$$M1 = \begin{bmatrix} \cos a, 0, -\sin a, 0 \\ 0, 1, 0, 0 \\ \sin a, 0 \cdot \cos a, 0 \\ 0, 0, 0, 1 \end{bmatrix}, M2 = \begin{bmatrix} 1, 0, 0, 0 \\ 0, \cos b, \sin b, 0 \\ 1, -\sin b, \cos b, 0 \\ 0, 0, 0, 1 \end{bmatrix}$$

and the 3D view A is post-multiplied with M1 and M2 to obtain the rotated view A'.

S3. determining a shearing angle for each of viewpoints according to coordinates of the center of the virtual scene, position coordinates of a viewer in the scene and coordinates of each of the viewpoints to generate a shearing matrix for each of the viewpoints in one-to-one correspondence, and post-multiplying the shearing matrix with a corresponding viewpoint model matrix to generate a left view and a right view by a second image processing module.

Figure 4:
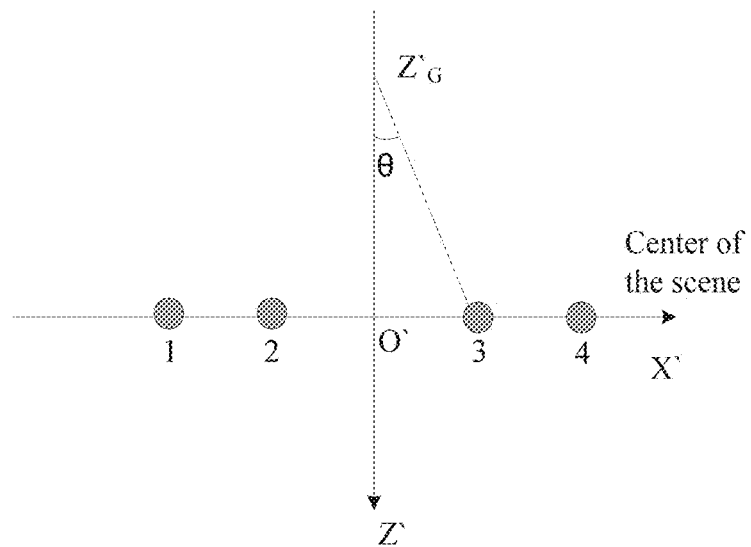
FIG. 4 is a schematic view illustrating relationships between a shearing angle and the position of a viewer in the scene, coordinates of a center of a viewpoint and the position of the viewpoint in the embodiment shown in FIG. 1.

The process of determining the shearing angle of the holographic virtual 3D view in this embodiment is shown in FIG. 4. FIG. 4 is a schematic view illustrating relationships between the shearing angle and the position of the viewer in the scene, coordinates of a center of a viewpoint and position of a viewpoint in the embodiment shown in FIG. 1. As shown in FIG. 4, a new coordinate system after the rotation is represented by O'-X'Y'Z', the origin O' coincides with the center position of the viewpoint in the original coordinate system, the positive Z'-axis direction points from the coordinates $Z_G$ of the viewer in the original coordinate system towards the coordinates of the center of the viewpoint, the shearing transformation refers to a transformation in which y' and z' coordinates of the viewpoint remain unchanged and an x' coordinate is linearly transformed by taking the z' axis as a dependent axis, the shearing angle θ refers to an angle included between the position of the viewpoint and the positive Z'-axis direction, four viewpoints shown in FIG. 4 include a viewpoint 1, a viewpoint 2, a viewpoint 3 and a viewpoint 4, the viewpoint 1 and the viewpoint 4 are a pair of viewpoints which are located in a left view and a right view respectively and correspond to each other, the viewpoint 2 and the viewpoint 3 are a pair of viewpoints which are located in the left view and the right view respectively and correspond to each other, an angle included between the viewpoint 3 and the positive Z'-axis direction is θ, and coordinates of any of the viewpoints are represented by (x", y", z") after the shearing. Then the shearing expression is as follows for all viewpoints located at the negative X'-axis direction:

$$\begin{cases} x'' = x' + (z' - z_G)\tan\theta \\ y'' = y' \\ z'' = z', \end{cases}$$

the corresponding shearing matrice are all as follows:

$$\begin{bmatrix} 1, 0, \tan\theta, -z_G, \tan\theta \\ 0, 1, 0, 0 \\ 0, 0, 1, 0 \\ 0, 0, 0, 1 \end{bmatrix},$$

the shearing expression is as follows for the viewpoint 2 located at the positive X'-axis direction:

$$\begin{cases} x'' = x' - (z' - z_G)\tan\theta \\ y'' = y' \\ z'' = z' \end{cases}$$

and the corresponding shearing matrix are all as follows:

$$\begin{bmatrix} 1, 0, -\tan\theta, z_G, \tan\theta \\ 0, 1, 0, 0 \\ 0, 0, 1, 0 \\ 0, 0, 0, 1 \end{bmatrix}.$$

In a preferred embodiment of the method for achieving transformation of a virtual view into a 3D view according to the present disclosure, the method shown in FIG. 1 further comprises the following step of:

S5. adjusting the shearing angle of the second image processing module and the position coordinates of the viewer in the scene by the user according to a 3D effect experienced by the user so as to improve the 3D effect of projecting a 3D image. Specifically, if the z' coordinate of any of the points in the scene is larger than the coordinate $Z_G$ of the viewer, the point moves towards the negative x'-axis direction during the shearing; and if the z' coordinate is smaller than the coordinate $Z_G$ of the viewer, the point moves towards the positive x'-axis direction during the shearing. Therefore, the viewpoint 2 and the viewpoint 3 have different shearing directions, but have the same shearing angle.

Any point A (x, y, z) of the view in the rectangular coordinate system O-XYZ is transformed into A' (x', y', z') in the rectangular coordinate system O'-X'Y'Z' after the rotation. A' is transformed into A" (x", y", z") after the shearing. Therefore, the correspondence relationship between A and A" is represented by A"=M1*M2*A*M3.

S4. projecting the left view and the right view of each of the viewpoints by the projection displaying module.

The projection displaying module 24 projects the sheared view so that the user can experience a holographic 3D view.

In a preferred embodiment of the method for achieving transformation of a virtual view into a 3D view according to the present disclosure, the user can adjust the shearing angle of the second image processing module and the position of the viewer in the scene according to his or her own experience to improve the 3D effect of a projection view.

Specifically, the user improves the 3D effect of a projection image by adjusting $Z_G$ and $\theta$.

If $Z_G$ is increased, then $Z-Z_G$ is decreased and, thus, the 3D effect is degraded; and otherwise, the 3D effect is enhanced.

If $\theta$ is increased $$\left(0 < \theta < \frac{\pi}{2}\right),$$

then tan $\theta$ is also increased and, thus, the 3D effect of the projection image is enhanced; and otherwise, the 3D effect is decreased.

Therefore, the method for achieving transformation of a virtual view into a 3D view according to the present disclosure can achieve a desirable 3D effect experience by properly adjusting $Z_G$ and $\theta$. In addition, in the embodiment of the present disclosure, the position coordinates of the human eye are tracked dynamically so that the user can see a desirable holographic 3D view during the moving process, and this prevents the problem that the user can experience a desirable holographic 3D view only at several fixed points.

Figure 5:
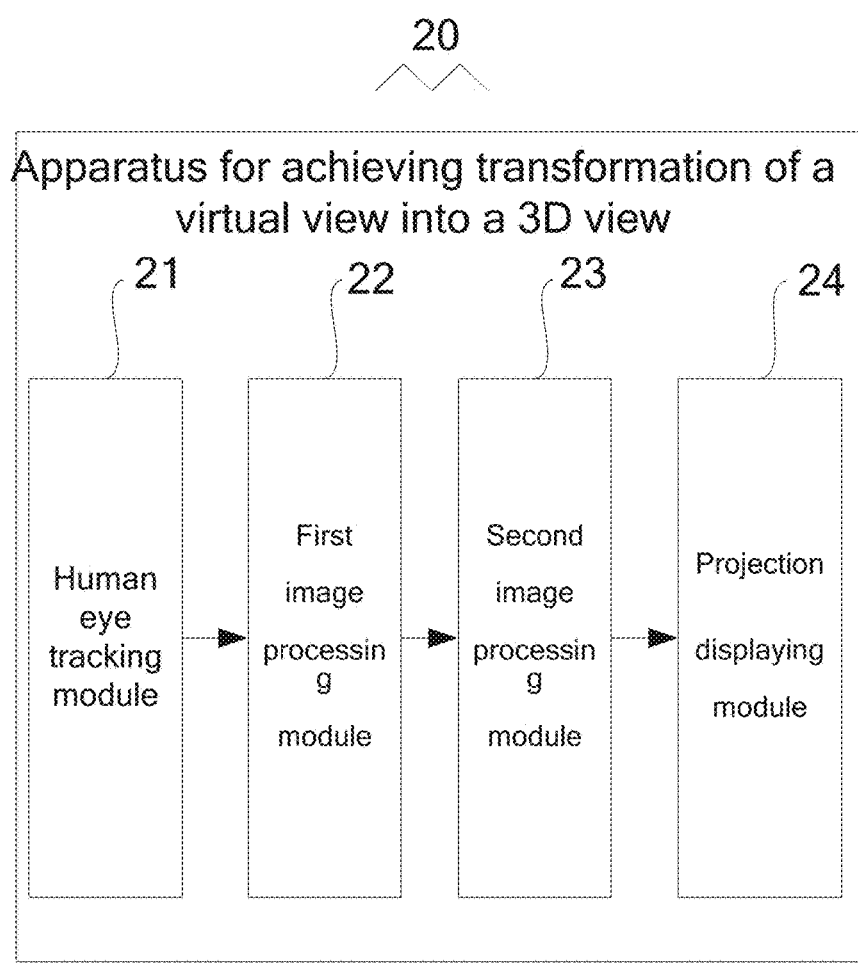
FIG. 5 is a schematic structural view of an embodiment of an apparatus for achieving transformation of a virtual view into a 3D view according to the present disclosure.

A second technical solution provided by the present disclosure is to provide an apparatus for achieving transformation of a virtual view into a 3D view. Referring to FIG. 5, there is shown a schematic structural view of an embodiment of an apparatus for achieving transformation of a virtual view into a 3D view according to the present disclosure. As shown in FIG. 5, an apparatus 20 for achieving transformation of a virtual view into a 3D view of this embodiment comprises: a human-eye tracking module 21, being configured to capture position coordinates of a human eye; a first image processing module 22 electrically connected with the human-eye tracking module 21, being configured to determine a rotation angle of a virtual scene according to the position coordinates of the human eye and coordinates of a center of a screen of a projection displaying module 24 and rotate the virtual scene according to the rotation angle to obtain a virtual holographic 3D view matrix; a second image processing module 23 electrically connected with the first image processing module 22, being configured to determine a shearing angle for each of viewpoints according to coordinates of a center of the virtual scene, position coordinates of a viewer in the scene and coordinates of each of the viewpoints to generate a shearing matrix for each of the viewpoints in one-to-one correspondence, and post-multiply the shearing matrix with a corresponding viewpoint model matrix to generate a left view and a right view; and the projection displaying module 24 electrically connected with the second image processing module 23, being configured to project the left view and the right view of each of the viewpoints.

In this embodiment, the human-eye tracking module 21 can track the position of the human eye in real time. Referring to FIG. 2, there is shown a schematic view illustrating angles included between position coordinates of the human eye and a screen. As shown in FIG. 2, in a 3D space rectangular coordinate system O-XYZ prior to the rotation of a virtual scene, a center of the screen is located at an origin O of the coordinate system O-XYZ, a projection of a connecting line from the human eye to the center O of the screen on the XOZ plane includes an angle $\alpha$ with the positive Z-axis direction, a projection of the connecting line from the human eye to the center O of the screen on the YOZ plane includes an angle $\beta$ with the positive Z-axis direction, the X-axis direction points from a midpoint of a left edge of the screen towards a midpoint of a right edge of the screen, and the Y-axis direction points from a midpoint of a top edge of the screen towards a midpoint of a bottom edge of the screen. In this embodiment, by use of the human-eye tracking module 21, holographic 3D views seen by the user can vary with the changing positions of the human eye during the moving process, and this prevents the problem that the user can see the holographic 3D view only at several fixed points.

A preferred solution of this embodiment is shown in FIG. 3. FIG. 3 is a schematic view illustrating position relationships between an angle by which a virtual scene is rotated about the Y-axis and the position of a human eye, a center of a scene and a screen. As shown in FIG. 3, a distance from a projection of the human eye on the XOZ plane to the screen is L, and a distance from a center of the virtual scene to the screen is $Z_{Center}$.

An angle $\alpha$ by which the scene is rotated about the Y-axis is represented by $$a = \arctan\frac{L \cdot \tan\alpha}{L+Z}$$

and similarly, an angle by which the scene is rotated about the X-axis is represented by $$b = \arctan\frac{L \cdot \tan\beta}{L+Z}.$$

A virtual holographic 3D view matrix is obtained by rotating the original virtual scene about the Y-axis by the angle $\alpha$ and then about the X-axis by the angle b. If a virtual scene view matrix prior to the rotation is represented by A and the virtual holographic 3D view matrix is represented by A', then A'=M1*M2*A, $$M1 = \begin{bmatrix} \cos a, 0, -\sin a, 0 \\ 0, 1, 0, 0 \\ \sin a, 0 \cdot \cos a, 0 \\ 0, 0, 0, 1 \end{bmatrix}, M2 = \begin{bmatrix} 1, 0, 0, 0 \\ 0, \cos b, \sin b, 0 \\ 1, -\sin b, \cos b, 0 \\ 0, 0, 0, 1 \end{bmatrix}$$

and the 3D view A is post-multiplied with M1 and M2 to obtain the rotated view A'.

The process of determining the shearing angle of the holographic virtual 3D view in this embodiment is shown in FIG. 4. FIG. 4 is a schematic view illustrating relationships between the shearing angle and the position of the viewer in the scene, coordinates of a center of a viewpoint and position of a viewpoint in the embodiment shown in FIG. 1. As shown in FIG. 4, a new coordinate system after the rotation is represented by O'-X'Y'Z', the origin O' coincides with the center position of the viewpoint in the original coordinate system, the positive Z'-axis direction points from the coordinates $Z_G$ of the viewer in the original coordinate system towards the coordinates of the center of the viewpoint, the shearing transformation refers to a transformation in which y' and z' coordinates of the viewpoint remain unchanged and an x' coordinate is linearly transformed by taking the z' axis as a dependent axis, the shearing angle θ refers to an angle included between the position of the viewpoint and the positive Z'-axis direction, four viewpoints as shown in FIG. 4 include a viewpoint 1, a viewpoint 2, a viewpoint 3 and a viewpoint 4, the viewpoint 1 and the viewpoint 4 are a pair of viewpoints which are located in a left view and a right view respectively and corresponding to each other, the viewpoint 2 and the viewpoint 3 in the left view and in the right view respectively are a pair of viewpoints which are located in a left view and a right view respectively and corresponding to each other, an angle included between the viewpoint 3 and the positive Z'-axis direction is θ as shown in FIG. 4, and coordinates of any of the viewpoints are represented by (x", y", z") after the shearing. Then the shearing expression is as follows for the viewpoint 2 located at the negative X'-axis direction:

$$\begin{cases} x'' = x' + (z' - z_G)\tan\theta \\ y'' = y' \\ z'' = z' \end{cases},$$

the corresponding shearing matrice are all as follows:

$$\begin{bmatrix} 1, 0, \tan\theta, -z_G, \tan\theta \\ 0, 1, 0, 0 \\ 0, 0, 1, 0 \\ 0, 0, 0, 1 \end{bmatrix},$$

the shearing expression is as follows for the viewpoint 3 located at the positive X'-axis direction:

$$\begin{cases} x'' = x' - (z' - z_G)\tan\theta \\ y'' = y' \\ z'' = z' \end{cases}$$

and the corresponding shearing matrice are all as follows:

$$\begin{bmatrix} 1, 0, -\tan\theta, z_G\tan\theta \\ 0, 1, 0, 0 \\ 0, 0, 1, 0 \\ 0, 0, 0, 1 \end{bmatrix}$$

In a preferred solution of this embodiment, the second image processing module 23 is further configured to change the shearing angle and the position coordinates of the viewer in the scene according to a user's input so as to improve the 3D effect of a 3D image obtained by the projection. Specifically, if the z' coordinate of any of the points in the scene is larger than the coordinate $Z_G$ of the viewer, the point moves towards the negative x'-axis direction during the shearing; and if the z' coordinate is smaller than the coordinate $Z_G$ of the viewer, the point moves towards the positive x'-axis direction during the shearing. Therefore, the viewpoint 2 and the viewpoint 3 have different shearing directions, but have the same shearing angle.

Any point A (x, y, z) of the view in the rectangular coordinate system O-XYZ is transformed into A' (x', y', z') in the rectangular coordinate system O'-X'Y'Z' after the rotation. A' is transformed into A" (x", y", z") after the shearing. Therefore, the correspondence relationship between A and A" is represented by A"=M1*M2*A*M3.

The projection displaying module 24 projects the sheared view so that the user can experience a holographic 3D view.

In a preferred embodiment of achieving transformation of a virtual view into a 3D view according to the present disclosure, the user can adjust the shearing angle of the second image processing module and the position of the viewer in the scene according to his or her own experience to improve the 3D effect of a projection view.

Specifically, the user improves the 3D effect of a projection image by adjusting $Z_G$ and θ.

If $Z_G$ is increased, then $Z-Z_G$ is decreased and, thus, the 3D effect is degraded; and otherwise, the 3D effect is enhanced.

If θ is increased $$\left(0 < \theta < \frac{\pi}{2}\right),$$

then tan θ is also increased and, thus, the 3D effect of the projection image is enhanced; and otherwise, the 3D effect is decreased.

According to the above descriptions, the method and the apparatus for achieving transformation of a virtual view into a 3D view provided by the present disclosure determine a rotation angle of a virtual scene by tracking dynamic coordinates of a human eye so that the virtual scene is rotated to obtain a virtual holographic 3D view matrix, then post-multiply a shearing matrix with a corresponding viewpoint model matrix and obtain an image of each viewpoint through projection, and adjust the position of the viewer in the scene and the shearing angle according to the 3D effect experienced by the user to finally provide a desirable 3D effect.

Furthermore, it is apparent to those skilled in the art, the present disclosure also provides a wireless communication apparatus, which comprises a non-transitory program storage medium and a processor. The non-transitory program storage medium stores a program executed by the processor to perform the method as described in above. Furthermore, it is apparent to those skilled in the art that, various modules 21, 22, 23, 24 as shown in FIG. 5 are software modules. In another aspect, it is well-known that various software modules inherently are stored in the non-transitory program storage medium and executed by the processor.

What described in the aforesaid embodiments is only an exemplary description of present disclosure, and those skilled in the art can make various modifications on the present disclosure without departing from the spirits and scope of the present disclosure upon reading this application.

What is claimed is:

1. A method for achieving transformation of a virtual view into a three-dimensional (3D) view, comprising the following steps of:
   capturing position coordinates of a human eye by a human-eye tracking module;
   determining a rotation angle of a virtual scene according to the position coordinates of the human eye and coordinates of a center of a screen of a projection displaying module, and rotating the virtual scene according to the rotation angle to obtain a virtual holographic 3D view matrix by a first image processing module;
   wherein if a virtual scene view matrix prior to the rotation is represented by A and the virtual holographic 3D view matrix is represented by A';
   then A'=M1*M2*A;

$$M1 = \begin{bmatrix} \cos a, 0, -\sin a, 0 \\ 0, 1, 0, 0 \\ \sin a, 0, \cos a, 0 \\ 0, 0, 0, 1 \end{bmatrix}, M2 = \begin{bmatrix} 1, 0, 0, 0 \\ 0, \cos b, \sin b, 0 \\ 1, -\sin b, \cos b, 0 \\ 0, 0, 0, 1 \end{bmatrix},$$

and the 3D view A is post-multiplied with M1 and M2 to obtain the rotated view A';
   wherein in a 3D space rectangular coordinate system O-XYZ prior to the rotation, the center of the screen is located at an origin of the coordinate system O-XYZ, a projection of a connecting line from the human eye to the center of the screen on the XOZ plane includes an angle $\alpha$ with the positive Z-axis direction, a projection of the connecting line from the human eye to the center of the screen on the YOZ plane includes an angle $\beta$ with the positive Z-axis direction, the X-axis direction points from a midpoint of a left edge of the screen towards a midpoint of a right edge of the screen, and the Y-axis direction points from a midpoint of a top edge of the screen towards a midpoint of a bottom edge of the screen; and
   an angle by which the virtual scene is rotated about the Y-axis is determined to be $$a = \arctan \frac{L \cdot \tan \alpha}{L + Z}$$

and an angle by which the virtual scene is rotated about the X-axis is determined to be $$b = \arctan \frac{L \cdot \tan \beta}{L + Z}$$

according to the angles $\alpha$ and $\beta$, a distance L from the human eye to the screen and a distance Z from a center of the virtual scene to the screen;
   wherein if a new coordinate system after the rotation is represented by O'-X'Y'Z', the origin O' coincides with the center position of the viewpoint in the original coordinate system, the positive Z'-axis direction points from the coordinates $Z_G$ of the viewer in the original coordinate system towards the coordinates of the center of the viewpoint, the shearing transformation refers to a transformation in which y' and z' coordinates of the viewpoint remain unchanged and an x' coordinate is linearly transformed by taking the z' axis as a dependent axis, the shearing angle $\theta$ refers to an angle included between the position of the viewpoint and the positive Z'-axis direction, and coordinates of any of the viewpoints are represented by (x", y", z") after the shearing, then the shearing expression is as follows for all viewpoints located at the negative X'-axis direction:

$$\begin{cases} x'' = x' + (z' - z_G)\tan\theta \\ y'' = y' \\ z'' = z' \end{cases}$$

the corresponding shearing matrix are all as follows:

$$\begin{bmatrix} 1, 0, \tan\theta, -z_G\tan\theta \\ 0, 1, 0, 0 \\ 0, 0, 1, 0 \\ 0, 0, 0, 1 \end{bmatrix},$$

the shearing expression is as follows for all viewpoints located at the positive X'-axis direction:

$$\begin{cases} x'' = x' - (z' - z_G)\tan\theta \\ y'' = y' \\ z'' = z' \end{cases}$$

the corresponding shearing matrix are all as follows:

$$\begin{bmatrix} 1, 0, -\tan\theta, z_G\tan\theta \\ 0, 1, 0, 0 \\ 0, 0, 1, 0 \\ 0, 0, 0, 1 \end{bmatrix};$$

determining the shearing angle $\theta$ for each of viewpoints according to coordinates of the center of the virtual scene, position coordinates $Z_G$ of the viewer in the virtual scene and coordinates of each of the viewpoints to generate a shearing matrix for each of the viewpoints in one-to-one correspondence, and post-multiplying the shearing matrix with a corresponding viewpoint model matrix A' to generate a left view and a right view by a second image processing module; and
   projecting the left view and the right view of each of the viewpoints by the projection displaying module.

2. The method of claim 1, the method further comprising the following step:
   adjusting the shearing angle $\theta$ and the position coordinates $Z_G$ of the viewer in the virtual scene by a user according to a 3D effect experienced by the user so as to improve the 3D effect of 3D image projection.

3. An apparatus for achieving transformation of a virtual view into a three-dimensional (3D) view, comprising:
   a human-eye tracking module, being configured to capture position coordinates of a human eye;
   a first image processing module electrically connected with the human-eye tracking module, being configured to determine a rotation angle of a virtual scene according to the position coordinates of the human eye and coordinates of a center of a screen of a projection displaying module and rotate the virtual scene according to the rotation angle to obtain a virtual holographic 3D view matrix;
wherein if a virtual scene view matrix prior to the rotation is represented by A and the virtual holographic 3D view matrix is represented by A';
then A'=M1*M2*A;

$$M1 = \begin{bmatrix} \cos a, 0, -\sin a, 0 \\ 0, 1, 0, 0 \\ \sin a, 0, \cos a, 0 \\ 0, 0, 0, 1 \end{bmatrix}, M2 = \begin{bmatrix} 1, 0, 0, 0 \\ 0, \cos b, \sin b, 0 \\ 1, -\sin b, \cos b, 0 \\ 0, 0, 0, 1 \end{bmatrix},$$

and the 3D view is post-multiplied with M1 and M2 to obtain the rotated view A';
wherein in a 3D space rectangular coordinate system O-XYZ prior to the rotation, the center of the screen is located at an origin of the coordinate system O-XYZ, a projection of a connecting line from the human eye to the center of the screen on the XOZ plane includes an angle α with the positive Z-axis direction, a projection of the connecting line from the human eye to the center of the screen on the YOZ plane includes an angle β with the positive Z-axis direction, the X-axis direction points from a midpoint of a left edge of the screen towards a midpoint of a right edge of the screen, and the Y-axis direction points from a midpoint of a top edge of the screen towards a midpoint of a bottom edge of the screen; and
an angle by which the virtual scene is rotated about the Y-axis is determined to be $$a = \arctan \frac{L \cdot \tan \alpha}{L + Z}$$

and an angle by which the virtual scene is rotated about the X-axis is determined to be $$b = \arctan \frac{L \cdot \tan \beta}{L + Z}$$

according to the angles α and β, a distance L from the human eye to the screen and a distance Z from a center of the virtual scene to the screen;
wherein if a new coordinate system after the rotation is represented by O'-X'Y'Z', the origin O' coincides with the center position of the viewpoint in the original coordinate system, the positive Z'-axis direction points from the coordinates $Z_G$ of the viewer in the original coordinate system towards the coordinates of the center of the viewpoint, the shearing transformation refers to a transformation in which y' and z' coordinates of the viewpoint remain unchanged and an x' coordinate is linearly transformed by taking the z' axis as a dependent axis, a shearing angle θ refers to an angle included between the position of the viewpoint and the positive Z'-axis direction, and coordinates of any of the viewpoints are represented by (x", y", z") after the shearing, then the shearing expression is as follows for all viewpoints located at the negative X'-axis direction:

$$\begin{cases} x'' = x' + (z' - z_G)\tan\theta \\ y'' = y' \\ z'' = z' \end{cases}$$

the corresponding shearing matrix are all as follows:

$$\begin{bmatrix} 1, 0, \tan\theta, -z_G\tan\theta \\ 0, 1, 0, 0 \\ 0, 0, 1, 0 \\ 0, 0, 0, 1 \end{bmatrix},$$

the shearing expression is as follows for all viewpoints located at the positive X'-axis direction:

$$\begin{cases} x'' = x' - (z' - z_G)\tan\theta \\ y'' = y' \\ z'' = z' \end{cases}$$

the corresponding shearing matrix are all as follows:

$$\begin{bmatrix} 1, 0, -\tan\theta, z_G\tan\theta \\ 0, 1, 0, 0 \\ 0, 0, 1, 0 \\ 0, 0, 0, 1 \end{bmatrix}.$$

a second image processing module electrically connected with the first image processing module, being configured to determine the shearing angle θ for each of viewpoints according to coordinates of the center of the virtual scene, position coordinates $Z_G$ of the viewer in the virtual scene and coordinates of each of the viewpoints to generate a shearing matrix for each of the viewpoints in one-to-one correspondence, and post-multiply the shearing matrix with a corresponding viewpoint model matrix A' to generate a left view and a right view; and
the projection displaying module electrically connected with the second image processing module, being configured to project the left view and the right view of each of the viewpoints.

4. The apparatus of claim 3, wherein the second image processing module is further configured to change the shearing angle θ and the position coordinates $Z_G$ of the viewer in the virtual scene according to a user's input so as to improve the 3D effect of a 3D image obtained by the projection.

5. An apparatus for achieving transformation of a virtual view into a three-dimensional (3D) view, wherein the apparatus comprises a non-transitory program storage medium and a processor, the non-transitory program storage medium stores a program executed by the processor to perform a method which comprises:
capturing position coordinates of a human eye by a human-eye tracking module;
determining a rotation angle of a virtual scene according to the position coordinates of the human eye and coordinates of a center of a screen of a projection displaying module, and rotating the virtual scene according to the rotation angle to obtain a virtual holographic 3D view matrix by a first image processing module;

wherein if a virtual scene view matrix prior to the rotation is represented by A and the virtual holographic 3D view matrix is represented by A';
then A'=M1*M2*A;

$$M1 = \begin{bmatrix} \cos a, 0, -\sin a, 0 \\ 0, 1, 0, 0 \\ \sin a, 0, \cos a, 0 \\ 0, 0, 0, 1 \end{bmatrix}, M2 = \begin{bmatrix} 1, 0, 0, 0 \\ 0, \cos b, \sin b, 0 \\ 1, -\sin b, \cos b, 0 \\ 0, 0, 0, 1 \end{bmatrix},$$

and the 3D view A is post-multiplied with M1 and M2 to obtain the rotated view A';
wherein in a 3D space rectangular coordinate system O-XYZ prior to the rotation, the center of the screen is located at an origin of the coordinate system O-XYZ, a projection of a connecting line from the human eye to the center of the screen on the XOZ plane includes an angle α with the positive Z-axis direction, a projection of the connecting line from the human eye to the center of the screen on the YOZ plane includes an angle β with the positive Z-axis direction, the X-axis direction points from a midpoint of a left edge of the screen towards a midpoint of a right edge of the screen, and the Y-axis direction points from a midpoint of a top edge of the screen towards a midpoint of a bottom edge of the screen; and
an angle by which the virtual scene is rotated about the Y-axis is determined to be $$a = \arctan \frac{L \cdot \tan \alpha}{L + Z}$$

and an angle by which the virtual scene is rotated about the X-axis is determined to be $$b = \arctan \frac{L \cdot \tan \beta}{L + Z}$$

according to the angles α and β, a distance L from the human eye to the screen and a distance Z from a center of the virtual scene to the screen;
wherein if a new coordinate system after the rotation is represented by O'-X'Y'Z', the origin O' coincides with the center position of the viewpoint in the original coordinate system, the positive Z'-axis direction points from the coordinates $Z_G$ of the viewer in the original coordinate system towards the coordinates of the center of the viewpoint, the shearing transformation refers to a transformation in which y' and z' coordinates of the viewpoint remain unchanged and an x' coordinate is linearly transformed by taking the z' axis as a dependent axis, a shearing angle θ refers to an angle included between the position of the viewpoint and the positive Z'-axis direction, and coordinates of any of the viewpoints are represented by (x", y", z") after the shearing, then the shearing expression is as follows for all viewpoints located at the negative X'-axis direction:

$$\begin{cases} x'' = x' + (z' - z_G)\tan\theta \\ y'' = y' \\ z'' = z' \end{cases},$$

the corresponding shearing matrice are all as follows:

$$\begin{bmatrix} 1, 0, -\tan\theta, z_G\tan\theta \\ 0, 1, 0, 0 \\ 0, 0, 1, 0 \\ 0, 0, 0, 1 \end{bmatrix}$$

the shearing expression is as follows for all viewpoints located at the positive X'-axis direction:

$$\begin{cases} x'' = x' - (z' - z_G)\tan\theta \\ y'' = y' \\ z'' = z' \end{cases}$$

the corresponding shearing matrice are all as follows:

$$\begin{bmatrix} 1, 0, -\tan\theta, z_G\tan\theta \\ 0, 1, 0, 0 \\ 0, 0, 1, 0 \\ 0, 0, 0, 1 \end{bmatrix}$$

determining the shearing angle θ for each of viewpoints according to coordinates of the center of the virtual scene, position coordinates $Z_G$ of the viewer in the virtual scene and coordinates of each of the viewpoints to generate a shearing matrix for each of the viewpoints in one-to-one correspondence, and post-multiplying the shearing matrix with a corresponding viewpoint model matrix A' to generate a left view and a right view by a second image processing module; and
projecting the left view and the right view of each of the viewpoints by the projection displaying module.

6. The apparatus of claim 5, wherein the method performed by the processor further comprises:
adjusting the shearing angle θ and the position coordinates $Z_G$ of the viewer in the virtual scene by a user according to a 3D effect experienced by the user so as to improve the 3D effect of 3D image projection.

* * * * *